United States Patent [19]

Harris

[11] Patent Number: 4,783,957

[45] Date of Patent: Nov. 15, 1988

[54] FUEL CONTROL CIRCUIT FOR A TURBINE ENGINE

[75] Inventor: James J. Harris, San Diego, Calif.

[73] Assignee: Sundstrand Corporation, Rockford, Ill.

[21] Appl. No.: 946,455

[22] Filed: Dec. 23, 1986

[51] Int. Cl.4 ............................................. F02C 9/28
[52] U.S. Cl. ............................ 60/39.281; 364/431.02
[58] Field of Search ......................... 60/39.281, 39.282; 364/931.02

[56] References Cited

U.S. PATENT DOCUMENTS

| | | | |
|---|---|---|---|
| 3,747,340 | 7/1973 | Fenton et al. | 60/39.281 |
| 3,805,514 | 4/1974 | Sewell et al. | 60/39.281 |
| 3,830,055 | 8/1974 | Erlund | 60/39.281 |
| 3,939,649 | 2/1976 | McCabe | 60/39.281 |
| 3,956,884 | 5/1976 | Eves | 60/39.281 |
| 4,044,554 | 8/1977 | West | 60/39.281 |
| 4,134,258 | 1/1979 | Hobo et al. | 60/39.281 |
| 4,188,781 | 2/1980 | Johnson et al. | 60/39.281 |
| 4,321,791 | 3/1982 | Carroll | 60/39.281 |
| 4,344,141 | 8/1982 | Yates | 60/39.281 |
| 4,394,811 | 7/1983 | Swick | 60/39.281 |
| 4,411,133 | 10/1983 | Stearns | 60/39.281 |
| 4,470,118 | 9/1984 | Morrison | 60/39.281 |
| 4,625,510 | 12/1986 | Evans | 60/39.281 |

Primary Examiner—Louis J. Casaregola
Attorney, Agent, or Firm—William D. Lanyi

[57] ABSTRACT

In a fuel control system for turbine engines, it is beneficial to provide a minimum fuel signal which prevents the fuel demand of the turbine engine from being decreased below a lower limit which can cause flameout or extinction. The fuel control system of the present invention provides an electronic circuit that includes a portion which dynamically determines the minimum fuel demand of the turbine engine during operation. A circuit is provided to compare the power output of the turbine engine to a predetermined threshold magnitude. The no-load or low-load minimum fuel demand level is continually monitored until the power output of the turbine engine exceeds the predetermined threshold magnitude at which time the stored value of fuel demand is inhibited from being subsequently changed. During later operation of the turbine engine, the stored value of minimum fuel demand is provided to a most fuel bus to operate as a minimum limit of fuel demand for the turbine engine. A temperature compensation device adjusts the minimum fuel demand in response to temperature changes that can occur after the minimum fuel demand is stored.

29 Claims, 2 Drawing Sheets

FUEL CONTROL CIRCUIT FOR A TURBINE ENGINE

BACKGROUND OF THE INVENTION

1. Field of the Invention

The present invention relates generally to a fuel control circuit for a turbine engine and, more specifically, to a circuit which determines a minimum fuel demand level which is sufficient to prevent flameout during operation of a turbine engine under load.

2. Description of the Prior Art

In systems which utilize a turbine engine, the quantity of fuel provided to the turbine is generally regulated in response to the rotational speed of the turbine. As additional loads are imposed on the turbine engine, its rotational speed typically tends to decrease and, in response, a governor circuit increases the fuel demand of the turbine so that the turbine's speed can be increased to a predetermined nominal magnitude. Situations can arise under typical operating conditions which will cause the governor circuit to attempt to rapidly decrease the fuel supplied to the turbine. For example, if loads on the turbine engine are suddenly decreased, its speed will tend to increase and cause the governor circuit to respond by reducing the fuel demand of the turbine engine so that its rotational speed can be reduced to the predetermined nominal magnitude. It is therefore possible that a fuel control system, in an attempt to quickly decrease the rotational speed of a turbine, will cause the fuel demand level to be reduced by such an amount that a flameout condition can arise, resulting in an extinction of burning.

Various known systems have addressed the problem of fuel control for a turbine engine and the related problems relating to flameout. U.S. Patent No. 3,939,649 which issued on Feb. 24, 1976 to McCabe discloses a hydro-mechanical fuel control for a turboshaft engine that includes a gas producer control and an independent power turbine governor in series flow relationship. The power turbine governor includes a fuel flow reset governor and a deceleration system to prevent flameouts. It provides a fuel control system that responds to compressor discharge pressure, gas producer speed, power turbine speed and power level inputs. To prevent the governor from regulating fuel flow below a level which will cause a flameout, a minimum flow stop adjustment screw is used to define a minimum fuel flow below which the governor is unable to reduce the flow of fuel.

U.S. Pat. No. 4,470,118 which issued on Sept. 4, 1984 to Morrison discloses a gas turbine engine fuel control system which provides a deceleration look-up table that is based on engine manufacturer's data and is stored in a memory device. The deceleration look-up table contains values which are used to determine a desired deceleration rate for the gas turbine engine.

U.S. Pat. No. 4,344,141 which issued on Aug. 10, 1982 to Yates describes a gas turbine engine control system which stores values of the maximum and minimum desired rate of change of fuel flow at various speeds beyond which surge or extinction will occur. The control system produces output signals in accordance with the engine speed and acceleration for controlling fuel flow so that it follows closely within surge or extinction curves. During deceleration, a table which contains the slope of an extinction line at different engine speeds is addressed and the fuel flow is altered in such a way that the engine performance follows a number of successive steps parallel to the extinction line and flameout is avoided.

U.S. Pat. No. 4,321,791 which issued on Mar. 30, 1982 to Carroll describes an electronic fuel control system for a gas turbine engine which provides a predetermined fuel schedule that controls the minimum and maximum amount of fuel supplied to a gas turbine engine during both transient and steady-state operation. A minimum fuel schedule circuit is used to insure that a minimum amount of fuel will be provided to the turbine during deceleration so that loss of combustion can be prevented. The minimum fuel schedule is provided by a circuit comprising potentiometers and resisters.

U.S. Pat. No. 4,188,781 which issued on Feb. 19, 1980 to Johnson et al discloses a control circuit for sensing and correcting deviations in speed of a turbine-generator. If provides a non-linear speed control signal that is characterized by a first substantially constant slope for deviations in speed below a preselected deviation and a second substantially greater slope for deviations in speed above the preselected deviation, but does not directly address the problem of minimum fuel demand which is necessary to prevent flameout or extinction.

U.S. Pat. No. 4,134,258 which issued on Jan. 16, 1979 to Hobo et al discloses a fuel control system for controlling the supply of fuel to a gas turbine engine in all the engine operating ranges including the acceleration, deceleration and partial load operations. The fuel control system comprises load control signal generating means and idling control signal generator means, but does not directly provide any means for assuring that the fuel supply to the gas turbine engine does not fall below a level required to prevent flameout.

U.S. Pat. No. 4,044,554 which issued on Aug. 30, 1977 to West discloses an electronic circuit that is used to control a gas turbine engine primarily as a function of turbine inlet temperature and compressor speed. It includes a compensation loop that is particularly designed to provide quick response to acceleration demands and a smooth transition to temperature limiting. It does not address the problems which relate to the minimum fuel level required to avoid flameout or extinction during deceleration.

U.S. Pat. No. 3,956,884 which issued on May 18, 1976 to Eves discloses an electronic fuel control for a gas turbine engine which comprises a manual control for setting the desired value of an engine parameter. It does not provide a minimum fuel setting for prevention of extinction of the gas turbine.

U.S. Pat. No. 3,830,055 which issued on Aug. 20, 1974 to Erlund discloses an automatic re-light control system for a gas turbine engine. It operates an igniter if a signal corresponding to the quotient of the rate of change of speed of an engine shaft and an engine pressure exceeds a scheduled value. Similarly, U.S. Pat. No. 3,805,514 which issued on Apr. 23, 1974 to Sewell et al discloses a control system for a gas turbine engine which detects deceleration of the engine above a predetermined limit which corresponds to flameout. It responds to flameout by initiating a re-lighting procedure. U.S. Pat. No. 3,747,340 which issued on July 24, 1973 to Fenton et al discloses a flame sensing system for a turbine engine which monitors the difference between the combustion products leaving a combustion chamber and the air entering the combustion chamber and compares this difference to a reference value that is based on the mass ratio of the fuel and air supplied to the combustion chamber. A negative output signal is indicative of a flameout condition. This device does not prevent flameout from occurring but, instead, reacts to the existence of a flameout condition.

Known fuel control systems for gas turbine engines, which address the problem of flameout or extinction, typically utilize preset conditions to prevent fuel flow to the turbine from falling below some predetermined limit under which flameout would be expected to occur. These systems attempt to determine the minimum fuel demand limit prior to the actual operation of the gas turbine. The McCabe patent discussed above utilizes a mechanical setting to prevent the fuel flow from being decreased below the predetermined limit. It utilizes a threaded device that is manually set prior to operation of the gas turbine. The Carroll patent discussed above utilizes preset potentiometers to determine a minimum fuel level which is intended to prevent flameout. The Morrison and Yates patents utilize fuel schedules which are stored prior to operation of the gas turbine and are based on manufacturing data.

The actual level of fuel flow to a gas turbine engine which is required to prevent flameout can vary significantly as a function of many different parameters. For example, the required minimum fuel demand of a gas turbine can be affected by ambient temperature and pressure or the calibration of the fuel control system. Furthermore, the type and quality of the fuel and the condition of the turbine can have a significant effect on the actual amount of fuel required by the gas turbine to prevent extinction. Also, as the turbine engine ages, some of these characteristics can change. The known fuel control devices do not disclose any systems which dynamically react to these many variable parameters which can affect the minimum fuel demand level required by a gas turbine engine to avoid flameout.

Therefore, it would be significantly beneficial to provide a fuel control system for a turbine engine which can determine a proper minimum fuel demand during actual operation of the turbine so that flameout prevention procedure can be based on information relating to the turbine engine's actual operating characteristics.

SUMMARY OF THE INVENTION

The present invention relates generally to a fuel control system for a turbine engine and, more particularly, to a minimum fuel level determination circuit which dynamically determines a minimum fuel demand level during either no-load or low-load operation of the turbine engine, stores the determined minimum fuel demand level during subsequent operation of the turbine engine under higher load conditions that could otherwise introduce excessive error in the determination of the minimum fuel demand level, and uses the minimum fuel demand level to prevent flameout or extinction during off-load transients.

The minimum fuel demand level for a turbine engine, below which the turbine engine will experience a flameout or extinction of burning, can vary significantly depending upon various operational parameters. For example, the minimum fuel demand level required to prevent flameout can be affected by the type and quality of the fuel used by the turbine, the condition of the turbine engine (i.e. initial tolerances, age, cleanliness, level of wear of its component parts, level of maintenance, condition of various adjustments, etc.), the fuel value characteristics, air inlet temperature, air inlet pressure and various other parameters which are difficult to predict or quantify prior to actual operation of the turbine engine, such as the calibration accuracy of the turbine engine's fuel control system. The present invention dynamically determines this minimum fuel demand level during no-load or low-load operation of the turbine engine and therefore includes in this determination several variable parameters which would otherwise be difficult to quantify.

The present invention comprises a means for sensing the magnitude of output power of the turbine engine. This sensing means has, as its input, either a signal which is representative of the true power, measured in watts, or a signal which is representative of the apparent power, measured in voltamperes, and provides an output signal which is representative of the output power of the turbine engine. If an apparent power signal is provided as an input to this component it should be understood that this value will differ from true power by the power factor of the system. In a preferred embodiment of the present invention, the load current is used to provide this signal which is indicative of the voltampere output of the turbine engine. However, since the output of this sensing means is used by the present invention for comparison to a predefined threshold value, as will be discussed in greater detail below, errors from this difference between apparent power and true power can easily be limited by appropriate selection of the threshold value. This first signal, which is an output from the sensing means, is used as an input to a means for comparing it to a predefined threshold value so that the present invention can determine when the turbine engine output power exceeds a magnitude which indicates that it is no longer operating under no-load or low-load conditions which assures acceptable accuracy of the determined minimum fuel demand level. Therefore, it should be understood that the present invention categorizes the output power level of the turbine engine into two levels of magnitude. The first level includes a no-load or low-load level of operation during which the turbine engine output power is less than the predetermined threshold value. Depending on the magnitude of this threshold value, the first level of output power can be limited to no-load conditions or, for a slightly higher magnitude of threshold value, low-load conditions. The second output power level includes all output power magnitudes above the predefined threshold value. Depending on the setting of the threshold value, the present invention can react to increases in the output power of the turbine engine beyond either no-load or low-load conditions.

The present invention also comprises a second means for providing a second signal that is representative of the actual fuel demand of the turbine engine and varies in direct relationship with the actual fuel demand of the turbine engine. The fuel control system of the present invention also comprises a third means for providing a third signal that is representative of the minimum fuel demand. This third signal varies with a fixed offset from the second signal reduced by the first signal during no-load or low-load operation of the turbine engine when the output power of the turbine engine is less than the predefined threshold level. As the fuel demand of the turbine engine reduced by the load signal changes, this third signal also changes so that, during no-load or low-load conditions, the magnitude of the third signal is generally related to and offset from the magnitude of the second signal reduced by the magnitude of the first signal (i.e. the no load fuel demand level of the turbine engine).

The present invention also comprises a means for inhibiting the periodic adjustment of the third signal when the output power of the turbine engine is sensed as having surpassed the predefined threshold level which defines the upper limit of the no-load or low-load condition. When this threshold value is surpassed, the comparing means provides a fourth signal that is indicative of the fact that the turbine engine output has exceeded the level which has been predefined as representing a no-load or low-load condition. This fourth signal is used to inhibit the periodic adjustment of the third signal and, because of the operation of the inhibiting means, the magnitude of the third signal is held generally constant at a magnitude determined by the magnitude which existed at the time when the no-load or low-load threshold level was exceeded.

When the turbine engine is operating under load conditions, the stored value of the third signal is maintained for use at a later time when other portions of the turbine engine fuel control system may attempt to cause the fuel demand of the turbine engine to be decreased below levels which could otherwise result in a flameout or extinction of the turbine. This third signal therefore represents a minimum fuel demand level that has been empirically determined to be sufficient to operate the turbine engine under no-load or low-load conditions. Therefore, this dynamically determined minimum fuel demand level can be used as a lower limit to prevent other portions of the fuel control system from attempting to lower the fuel demand to a level which is below that required to avoid flameout or extinction. The magnitude of this minimum fuel demand level is determined from actual no-load or low-load operating conditions and therefore incorporates all those variable parameters that mutually affect the no-load and the minimum fuel demands of the turbine engine.

In a preferred embodiment of the present invention, the third providing means comprises a counter circuit which maintains a digital value representative of the actual minimum fuel demand level of the turbine engine during no-load or low-load conditions. The digital value maintained by the counter is provided as an input to a digital-to-analog converter which converts the digital signal to an analog signal that is used as the third signal by the present invention. The third providing means of the present invention also comprises a fuel level detector which has, as its inputs, the first, the second and the third signal described above. The fuel level detector determines whether the magnitude of the third signal should be increased or decreased to maintain its magnitude in conformance with a predefined relationship with the second signal reduced by the first signal. If the fuel level detector determines that the third signal should be increased, it causes the counter to increase its digital value accordingly. Similarly, if the fuel level detector determines that the third signal should be decreased, to more closely conform to its predetermined relationship with the second signal reduced by the first signal, the digital value stored by the counter is caused to be decreased. The third signal provided by the present invention is constantly altered, as described above, until the comparing means of the present invention determines that the output power of the turbine engine has exceeded the predefined threshold level which is used to determine whether the turbine engine is no longer operating in a no-load or low-load condition. When the comparing means determines that the power output of the turbine engine has surpassed this threshold level, a fourth signal is provided to the third providing means which causes the counter to be inhibited from updating its digital value. Therefore, the fourth signal causes the current magnitude of the third signal to be maintained, or stored, for later use as a minimum fuel level which will provide a means for preventing the fuel supply to the turbine engine from being lowered to unacceptable levels, below the magnitude of the third signal, which could result in a flameout or extinction of the gas turbine.

A preferred embodiment of the present invention also comprises a means for delaying the receipt of the fourth signal by the counter. This delay results in the storage of a digital value, by the counter, which is slightly higher than that which is representative of the actual fuel demand of the turbine engine at the precise instant when the threshold power level is exceeded. The present invention also comprises a means for providing an offset value to the stored third signal so that the third signal can be artificially maintained at a magnitude slightly higher than the actual steady state minimum fuel demand of the turbine engine. This offset value provides a transient safety factor for use in later operation during deceleration modes when other portions of the fuel control circuit can possibly attempt to rapidly decrease the fuel demand level of the turbine engine.

As described above, the present invention provides a means for measuring the output power of a turbine engine and a means for measuring the fuel demand of the turbine engine during operation when the output power is less than a predefined threshold value. Furthermore, the present invention provides a means for storing the value of minimum fuel demand that exists at the time when the output power of the turbine engine exceeds the predetermined threshold. This stored value of fuel demand is then utilized as a lower limit to prevent the fuel supply to the turbine engine from being decreased below this magnitude so that flameout or extinction of the turbine can be avoided. Therefore, the present invention provides a means for determining a minimum fuel demand for the turbine engine which is operative during the operation of the turbine engine and a means for storing the determined minimum fuel demand level. It further provides a means for measuring the output power of the turbine engine and a means for activating the storing means when the output power of the turbine engine exceeds a predefined threshold valve.

BRIEF DESCRIPTION OF DRAWING

The present invention will be more fully understood from a reading of the description of the preferred embodiment in conjunction with the drawing, in which.

DESCRIPTION OF THE PREFERRED EMBODIMENT

Figure 1:
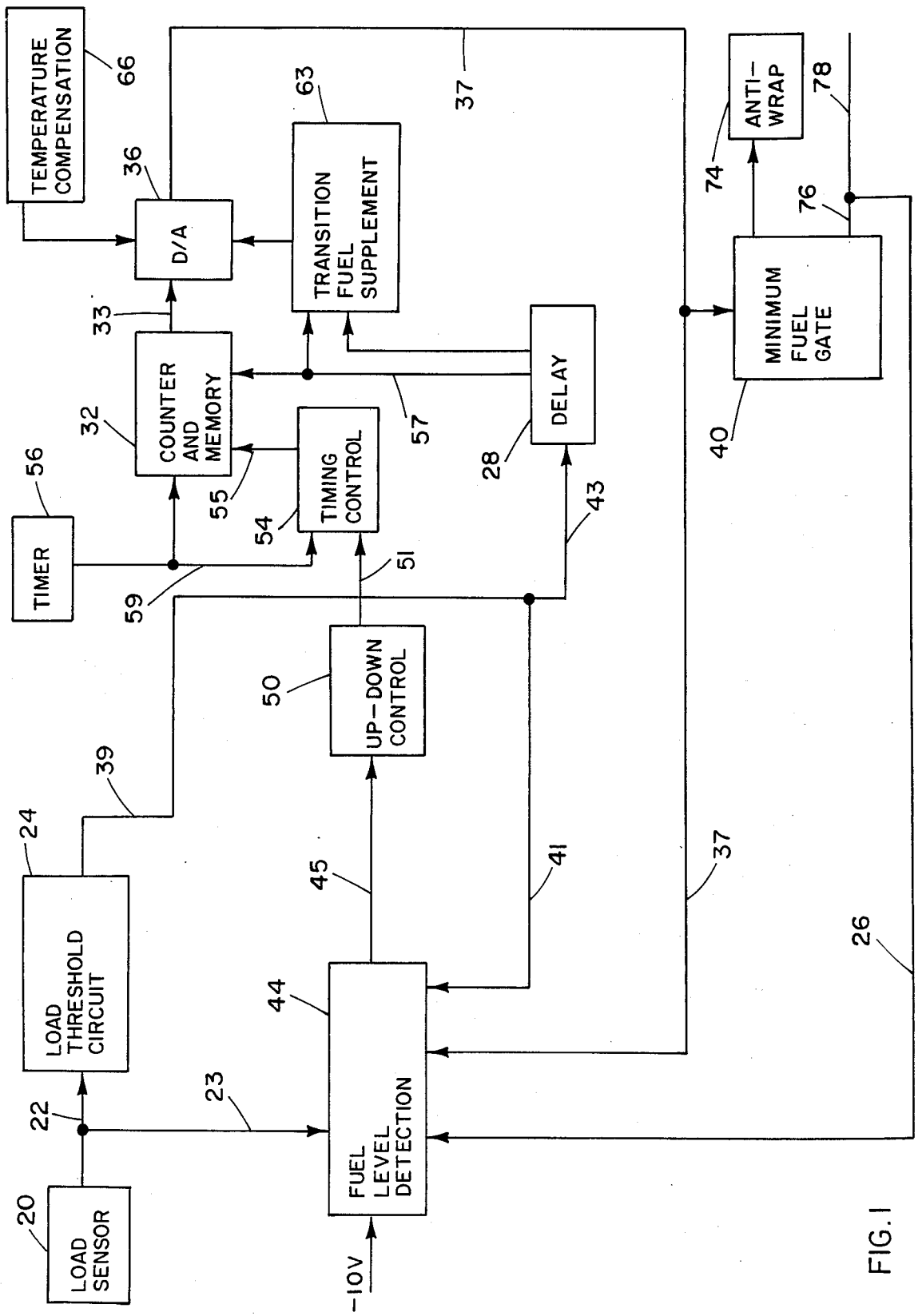
FIG. 1 is a simplified schematic drawing of the present invention.

Throughout the description of the preferred embodiment, like reference numerals will be used to describe like parts and components.

FIG. 1 illustrates a simplified schematic of the preferred embodiment of the present invention. A load sensor 20 is used to provide a first signal, on line 22, to a load threshold circuit 24. The load sensor 20 measures the output load of a turbine engine and provides this representative first signal that is used by the load threshold circuit 24 to compare the first signal to a predefined threshold level. Although the preferred embodiment of the present invention utilizes a current signal which represents the output voltamperes of the turbine engine, it should be understood that the load sensor 20 could be alternatively configured to provide a signal that is representative of the true output power of the turbine engine whether electrical, mechanical or pneumatic. For purposes of simplicity and economics, the preferred embodiment of the present invention uses the turbine engine's output current signal which, in a system having a generally constant voltage, is an effective way to represent apparent output power (i.e. voltamperes). The predefined threshold level represents a magnitude of output power below which the turbine engine is considered to be operating under a no-load or low-load condition. This threshold is selected so that errors in estimating the fuel demand contributed by the low-load are within acceptable limits, permitting a sufficiently accurate determination of the actual no-load fuel demand to achieve the desired result of setting the minimum fuel demand level to reliably avoid flameout. Above the predefined threshold level, the turbine engine is considered to be operating under a load condition. Therefore, the first measuring means of the present invention is provided by the load sensor 20 and its connection, on line 22, to the load threshold circuit 24.

The present invention utilizes a second signal, received on line 26, which represents the actual fuel demand level of the turbine engine. This second signal is received by the fuel level detection circuit 44. The first signal on line 22 is also received by the fuel level detector circuit through line 23.

A third signal providing means comprises a counter and memory 32, a digital-to-analog converter 36, a fuel level detector 44, an up-down control 50 and timing control 54. These components combine to provide a third signal, on line 37, which represents a minimum fuel demand level for the turbine engine. The output from the digital-to-analog converter 36, on line 37, is actually a negative voltage in the preferred embodiment of the present invention which represents the value of the minimum fuel demand for the turbine engine. When the turbine engine is operating under no-load or low-load conditions, the third signal is periodically updated, or adjusted, to maintain a predefined relationship between the third signal on line 37 and the second signal on line 26 reduced by the first signal on line 23. These three signals are connected, as inputs, to the fuel level detection circuit 44 which compares them to each other and determines whether the magnitude of the third signal on line 37 should be altered because of changes in the magnitude of the second signal on line 26 reduced by the magnitude of first signal on line 23. Depending on the results of this comparison by the detection circuit or fuel level detector 44, the up-down control 50 receives a signal on line 45 and controls the counter and memory unit 32. The counter stores a digital value that is maintained in a predefined relationship with the second signal on line 26, reduced by the first signal on line 23. The magnitude of the digital value is provided, as an input, to the digital-to-analog converter 36 which converts the digital value to an analog signal which results in the magnitude of the third signal on line 37. Therefore, the present invention provides a means for measuring a value of the fuel demand of the turbine engine when it is operating at an output power level which is less than the predefined threshold value. This measuring means comprises the fuel level detector 44, the up-down control circuit 50, the timing control 54, the counter and memory circuitry 32, the digital-to-analog converter 36 and the timer 56 which, as illustrated in FIG. 1, are inter-connected by lines 26, 33, 37, 45, 51, 55 and 58.

Figure 2:
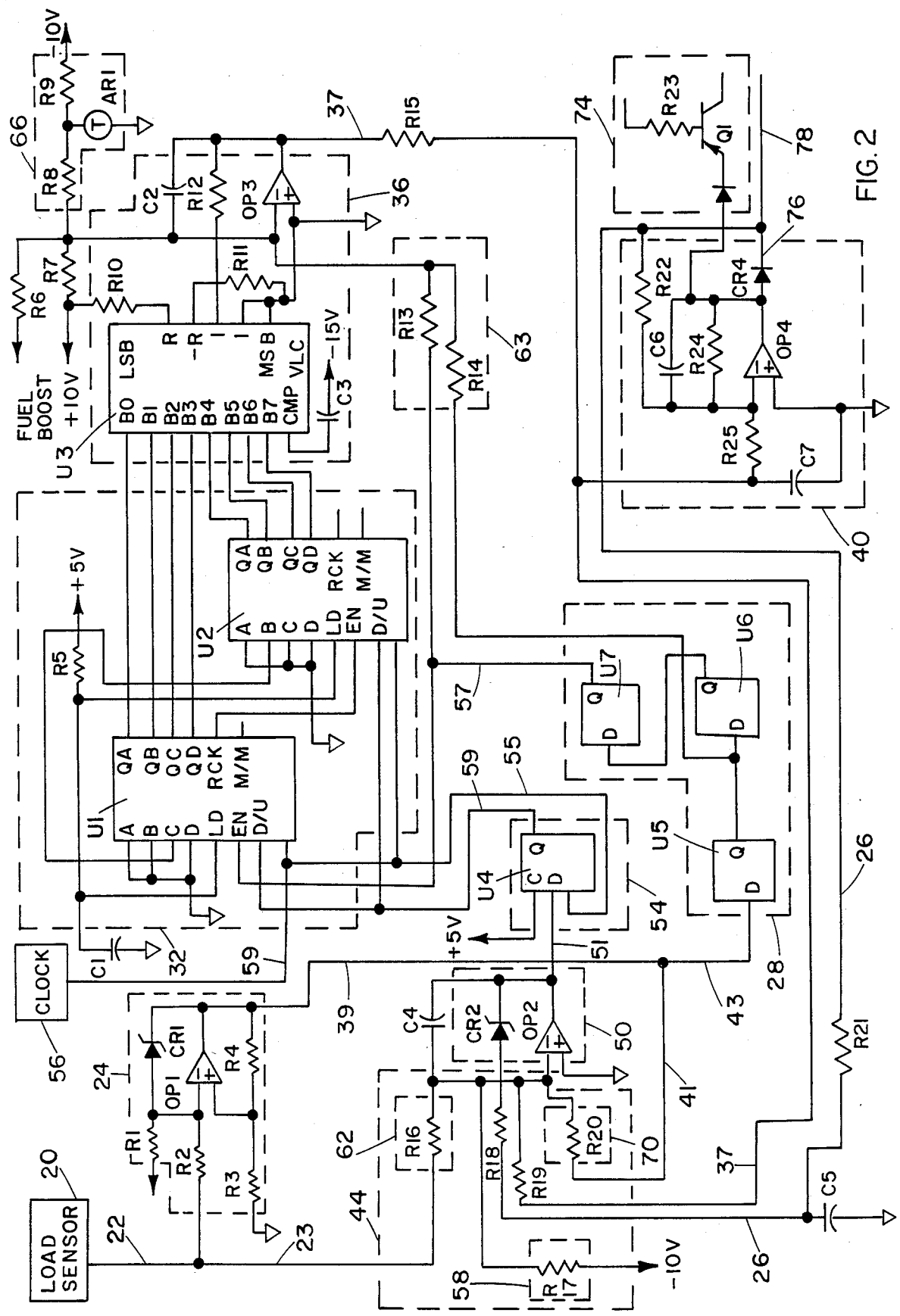
FIG. 2 is a detailed schematic drawing of the present invention.

When the load threshold circuit 24 detects that the power output of the turbine engine has exceeded the predefined threshold level, a fourth signal is provided, on line 39, to the counter and memory unit 32 through line 43 and the delay 28 and also to the fuel level detector 44 through line 41. The fourth signal causes the updating of the digital value stored by the counter and memory unit 32 to be inhibited. This inhibiting signal on line 39 causes the counter and memory unit 32 to cease its updating operations after a predefined delay and, therefore, store the existing magnitude of the digital value described above. The fourth signal, on line 39, is received by both the delay circuit 28 through line 43 and the fuel detector circuit 44 through line 41. As will be described in greater detail below, the fourth signal biases the fuel level detector circuit 44 in such a way that it tends to count up. The purpose of the transition upcount-bias circuit 70, which is shown in FIG. 2, is to assure that, during this transitionary period, the up-down control 50 causes the counter and memory circuit 32 to count upward instead of downward which could otherwise occur because of the unpredictability of the various magnitudes of the fuel-related and power-related signals at the precise instant when the load threshold circuit 24 detects that the output power of the turbine engine has exceeded the predefined threshold value. Therefore, when the turbine engine is operating at power levels above no-load or low-load conditions, the counter and memory unit 32 maintains a constant digital value that is representative of the minimum fuel demand that was empirically determined during operation of the turbine engine under no-load or low-load conditions. The digital-to-analog converter 36 continues to output the third signal on line 37, which represents this minimum fuel demand level, during no-load, low-load and load conditions. During operation of the turbine engine, the third signal on line 37 is used as an input to the minimum fuel gate 40 and the most fuel bus 78 and thus provides a lower limit of fuel demand for the turbine engine.

A time delay circuit 28 is provided by the present invention so that the fourth signal, on line 39 and 43, can be delayed by a preselected time period before its receipt by the counter and memory circuit 32 through line 57. The purpose of this delay is in anticipation of delaying the reduction of the minimum fuel demand level that will occur when tracking is resumed during the transitory condition of minimum fuel demand. This delay function also provides a transient safety factor by increasing the output from the digital-to-analog converter 36 which provides a transient margin in determining the minimum fuel demand level. Therefore, the present invention provides a means for storing a value representing the magnitude of fuel demand that existed at the time when the output power of the turbine engine initially exceeded the predefined threshold value. This storing means comprises the load threshold circuit 24 and the delay 28 which combine to inhibit the updating of the digital value stored in the counter and memory 32. The fourth signal that is output by the load threshold circuit 24, on line 39, inhibits further updating of the digital value by the counter and memory circuit 32 after a predefined delay that is determined by the delay circuit 28.

A timer 56 is used to provide a series of pulses on line 58 which determine the frequency at which the counter and memory unit 32 is updated. A timing control component 54 is used to control the sequence of events relating to the up-down control 50 and the counter and memory unit 32. The timer operates at eight hertz in a preferred embodiment of the invention. The timing control converts synchronous changes in the up-down control into changes that are synchronous with the timer clocking signal on line 59 to avoid incorrect operation of the counter memory unit 32 that can otherwise occur in the presence of time random changes in its up-down count input. The counter and memory unit 32 will count up or down one count for each timer clocking signal, or eight times a second in a preferred embodiment of the invention.

Referring to FIGS. 1 and 2, the fuel level detector 44, or detection circuit, is provided with an additional input which is an offset 58, as shown in FIG. 2, to the normal value that would otherwise be stored by the counter and memory unit 32. When the third signal on line 37 is compared to the second signal on line 26 reduced by the first signal on line 23, the offset 58 operates to bias the comparison by the fuel level detector 44 to provide the desired minimum fuel demand level derived from the actual no-load fuel demand. As shown in FIG. 2, the offset 58 is provided by a resistor R17.

The load fuel estimation circuit 62, as shown in FIG. 2, is used by the present invention to convert a current related signal, received from the load sensor 20 on line 23, to a signal that represents a magnitude of fuel demand associated with the sensed load. As will be described in greater detail below, the load fuel estimation circuit 62 comprises a resistive component R16 which converts a power related signal to an associated fuel magnitude related signal used by the fuel level detector 44 to reduce the low load signal on line 26 to a no-load fuel demand signal for comparison with the derived minimum fuel demand signal on line 37 which differs from the no-load signal by the offset signal provided by the offset 58.

The transition fuel supplement 63 shown in FIGS. 1 and 2, is used by the present invention to initially hold a higher minimum fuel demand during large offloads, returning after the short delay 28 to the previously determined steady state minimum fuel demand, during deceleration procedures which are controlled by other portions of the fuel control circuit, not shown in FIG. 1, when it is desirable to decrease the speed of rotation of the turbine. As will be described in greater detail below, the transition fuel supplement 63 comprises resistors R13 and R14 which, in cooperation with the delay circuit 28, causes the fuel demand during the initial offload transient to be initially reduced to a magnitude slightly greater than the steady state minimum fuel demand which is appropriate for the turbine engine. This delay provides for differences in the minimum fuel required to avoid flameout for internal turbine engine conditions at high load and at low or no load.

As shown in FIG. 1, a preferred embodiment of the present invention also comprises a temperature compensation circuit 66 which is used to alter the magnitude of the third signal that is output by the digital-to-analog converter 36. The purpose of the temperature compensation circuit 66 is to adjust the value of the third signal in conformance with changes in temperature. Although the digital value stored in the counter and memory unit 32 remains unchanged regardless of temperature changes, the conversion of the digital value to an analog value is affected by the temperature compensation circuit 66 to adjust for these temperature changes that can occur while the turbine is operating under high load conditions.

An anti-wrap circuit 74 is provided to prevent other portions of the turbine engine fuel control system from causing the fuel demand integrator signal to be driven to extreme values during transient conditions when the minimum fuel circuit has taken control of the fuel demand via the most fuel bus 78. Without an anti-wrap circuit 74, an integrator could possibly be driven to such a reduced fuel extreme, by other portions of the turbine engine's fuel control system, that the time required to drive the integrator to reasonable operational levels would cause excessive speed undershoot and delay in the recovery of turbine speed to its desired set point after the transient condition ceases to exist. The anti-wrap circuit 74 monitors the minimum fuel gate and the input gate from the other portions of the turbine engine fuel control system to the most fuel bus and whenever the minimum fuel gate takes control of the most fuel bus, the anti-wrap circuit overrides the other input to the integrator, forcing the integrator to track near, but lower than, the fuel demand level set by the minimum fuel gate circuit 40.

The third signal, on line 37, is provided to a minimum fuel gate 40 which, in turn, is connected to a most fuel bus 78. Therefore, the present invention provides a means for preventing the fuel demand of the turbine engine from being reduced to a magnitude that is less than the third value. When other portions of the turbine engine's fuel control system attempt to reduce the fuel demand of the turbine engine below the magnitude of this third signal, this potential flameout condition is prevented because of the fact that the most fuel bus 78 has, as one of its inputs, an output from the present invention which would represent the most fuel request. Therefore, the third signal from the present invention operates to provide a lower limit for the most fuel bus 78 and prevents other portions of the fuel control system from causing the fuel demand of the turbine engine to be reduced below this level.

FIG. 2 illustrates a more detailed schematic diagram of a preferred embodiment of the present invention. The load sensor 20 provides a first signal on line 22 to the load threshold circuit 24. As shown in FIG. 2, this first signal is connected to the inverting input of an operational amplifier OP1 and, when the first signal is determined, by the operational amplifier OP1, to exceed a predefined threshold value determined by resistors R1 and R2, a fourth signal is provided on line 39. This fourth signal represents the occurrence when the first signal surpasses the predefined threshold value, indicating that the output power of the turbine engine has exceeded a predetermined magnitude defining the upper limit of the no-load or low-load operational range of the turbine engine. The first signal, on line 23, is also provided as an input to the fuel level detector 44 which controls the up-down control circuit 50. The purpose of this signal is described in detail below as part of the description of the fuel level detector 44.

The fourth signal, on line 39, is also provided as an input to the fuel level detector 44 through resistor R20.

The transition upcount-bias circuit 70, in a preferred embodiment of the present invention, comprises a resistor R20 which performs an important function during transition from a no-load or low-load condition to a load condition. As discussed above, this transition is defined as the occurrence of a power output magnitude from the turbine engine which exceeds a predefined threshold. Exceeding the predefined threshold causes a high level output from operational amplifier OP1 in the load threshold circuit 24. This output, on line 39, is received as an input on line 43 by the delay circuitry 28. Simultaneous with the receipt of this fourth signal by the delay circuitry 28, it is also received by the inverting input of operational amplifier OP2 on line 41. The presence of the resistive component R20 forces the operational amplifier OP2 into its upcount state, removing potential ambiguities that might otherwise be introduced by imperfect components during this transitional period. In other words, following normal tracking operation, the up-down control 50 will command an upcount during the period of time when the load threshold circuit 24 is providing an output on lines 39, 41 and 43 as the fourth signal, to the delay circuitry 28.

The fuel level detector 44 is provided with five inputs. The first input on line 23 is provided to the fuel level detector 44 by the load fuel estimation circuit 62. The load fuel estimation circuit 62, in a preferred embodiment of the present invention, comprises resistor R16 which is connected between the load sensor 20 and the inverting input of operational amplifier OP2. The primary function of resistor R16 is to provide a calibration between the voltage analog of current that is output from the load sensor 20 and a current signal, that represents a specified magnitude of fuel demand associated with the load, which flows into the inverting input of amplifier OP2. In other words, the voltage on lines 22 and 23, in concert with resistor R16, injects a current into the inverting input of the operational amplifier OP2 whose magnitude represents the fuel increase caused by the turbine load. The second input on line 26, passes through resistor R18 before being coupled to the inverting input of the comparator OP2. This second signal, in concert with resistor R18, draws a current out of the inverting input of operational amplifier OP2 whose magnitude represents the total fuel demand. The third input on line 37 passes through resistor R19 prior to being coupled to the inverting input of the comparator OP2. The third input, in concert with R19, injects a current representing the magnitude of the minimum fuel demand into the inverting input of operational amplifier OP2. The fourth input on lines 39 and 41 passes through resistor R20 to force an upcount as described previously. The fifth input is a minus 10 V reference passing through R17. This offset 58 injects a current into the inverting input of operational amplifier OP2 that represents the difference in fuel demand between the no-load fuel demand and the minimum fuel demand.

When the fourth signal is not present on line 39, the fuel level detector 44 continually sums all of the remaining currents flowing into the inverting input of the comparator OP2. The output of the up-down control 50 drives the counter and memory circuit count in a direction which changes the magnitude of the third signal on line 37 such that the net current is driven towards zero current. This action continues until the net current, including the bias current of operational amplifier OP2, passes through zero and begins to flow in the opposite direction with a simultaneous change in output level of comparator OP2.

The up-down control 50 and the fuel level detector 44 operate in association with each other to provide an output signal to the timing control 54, which comprises a flip-flop U4. Signals from the timing control 54 are provided to the counter and memory unit 32, which comprises two up-down counters U1 and U2. These two counters combine to store a digital value that is representative of the magnitude of the fuel demand signal on line 26 reduced by the load analog signal on line 23. The magnitude of this digital value is converted to an analog value by the digital-to-analog converter U3. As can be seen in FIG. 2, counter U1 stores the least significant four bits of a binary representation of this digital value and counter U2 stores the most significant four bits of the binary representation of this digital value. In response to signals received from the timing control 54, the counter U1 and U2 increment or decrement their values in sequence with pulses received from the clock 56. The digital value stored by the counters is either incremented or decremented based on the relative magnitude of the third signal with respect to the second signal reduced by the first signal.

The counters, U1 and U2, are inhibited from changing their values when the fourth signal is present on line 57. When the fourth signal is output by the load threshold circuit 24, it passes through a series of flip-flops, U5, U6 and U7 to the counter and memory unit 32 through line 57. These three flip-flops, which are contained in the delay circuit 28, provide a preselected time delay between the occurrence of the fourth signal, as an output on line 39 from the load threshold circuit 24, and receipt of that fourth signal by the counter and memory unit 32 through line 57. As described above, this time delay is used to assure sufficient recovery from the offload transient condition before the auto set minimum fuel circuit is allowed to resume tracking the no-load or low-load fuel demand. The transition fuel supplement circuit 63, which comprises resistors R13 and R14, are also driven from the outputs of these delay flip-flops. As described above, these resistors R13 and R14 provide a small transitional increase above the no-load steady state minimum fuel demand to provide for the small increase in minimum fuel demand under the turbine internal conditions present at full load.

Since the initial delay occurs during a time when the up-down counter is forced to count up, the digital value stored by the counters will be artificially high by a slight amount because of the delay provided by the delay circuitry 28. The deceleration transitional fuel supplement 63, as described above, is operative during deceleration modes when other portions of the fuel control circuit are causing the fuel demand level of the turbine engine to be lowered for the purpose of decreasing the rotational speed of the turbine. Resistors R13 and R14 are disposed between the outputs of the delay circuitry 28 and the inverting input of the operational amplifier OP3 in the digital-to-analog converter 36. These resistors are used to transiently increase the minimum fuel demand setting to the inverting input of operational amplifier OP3 by a specified amount to prevent the fuel demand from decreasing to the no-load or low-load steady state minimum fuel demand level in one large step decrease. In operation, the fuel level will decrease to a magnitude which is slightly larger than the steady state minimum fuel demand level and then maintain this magnitude for a short period of time prior to decreasing further for a short period of time and then finally decreasing to the predetermined steady state minimum fuel demand level.

The non-inverting input of operational amplifier OP3 is connected to ground, as shown in FIG. 2, and its inverting input is connected to both the output from the digital-to-analog converter U3 and the temperature compensation circuit 66. The operational amplifier OP3, along with its feedback components R12 and C2, convert a positive current signal from the digital-to-analog converter U3 to a negative voltage signal on line 37 which represents the minimum fuel demand level determined by the present invention. As can be seen in FIG. 2, the inverting input of operational amplifier OP3 is also connected to a fuel boost circuit through resistor R6. The fuel boost circuit and its relationship to the operational amplifier OP3 is not directly related to the operation of the present invention. However, this connection is provided for use during initial start up of the turbine engine. During periods when the fuel demand rises from zero to a relatively high magnitude, a signal from the fuel boost circuit through resistor R6 is provided to the inverting input of operational amplifier OP3 to cause the operational amplifier to respond to this sudden increase in fuel demand near the end of start-up procedures, providing better tracking of the fuel demand as the turbine first reaches 100% speed. The temperature sensitive device AR1, shown in FIG. 2 in association with the temperature compensation circuit 66, is type LM135 which is available in commercial quantities from the National Semiconductor Corporation. This circuit causes the minimum fuel demand setting to vary with changes in temperature that may occur while the turbine is operating in the high load mode.

After the counter and memory unit 32 is inhibited from incrementing or decrementing its digital value because of the fact that the first signal, on line 22, has exceeded the predefined threshold value, the third signal on line 37 represents a generally constant value of the minimum fuel demand required by the turbine engine to prevent flameout or extinction. However, it should be understood that the magnitude of the third signal on line 37 can be changed by the temperature compensation circuit 66 as temperature changes occur. This third signal is provided to the minimum fuel gate 40, which operates in conjunction with an anti-wrap circuit 74 and the most fuel bus 78. The third signal is connected to the inverting input of an operational amplifier OP4 and the output of the operational amplifier OP4 is coupled to the most fuel bus 78. The most fuel bus is also coupled to line 26 through noise filter, comprising resistor R21 and capacitor C5, to provide the second signal as an input to the fuel level detector 44. If the minimum fuel demand is the highest signal driving the most fuel bus 78, then it controls the most fuel bus output through diode CR4. If another higher signal is present on the most fuel bus from other portions of the turbine engine fuel control, then diode CR4 is reverse biased in the off state, disconnecting the minimum fuel gate from the most fuel bus.

The output of the operational amplifier OP4 is coupled, by diode CR4 and line 76, to the most fuel bus line 78 which has a plurality of inputs from various portions of other fuel control circuits. These inputs are compared to each other and the input with the most positive magnitude is used to determine the magnitude of fuel demand for the turbine engine. Since the output from the operational amplifier OP4 represents a minimum fuel demand level, it will serve as a lower limit if the other fuel control circuits attempt to command the fuel demand of the turbine engine to levels which are below the minimum fuel demand required to prevent flameout or extinction.

Although it should be apparent that many alternative embodiments of the detailed circuit shown in FIG. 2 are possible, the specific types and values of components used in the preferred embodiment of the present invention are shown in Table I below. The up-down counters U1 and U2, in a preferred embodiment of the present invention, are type 54LS191 which are available in commercial quantities from the Texas Instruments Corporation. The digital-to-analog converter U3 is style number DAC08 which is available in commercial quantities from the Analog Devices Corporation. Flip-flops U4, U5, U6 and U7 are style number 54LS175A which are available in commercial quantities from the Texas Instruments Corporation and zenor diodes CR1 and CR2, in a preferred embodiment of the present invention, are style number 1N751A and are available in commercial quantities from the Motorola Corporation. Diodes CR3 and CR4 in the preferred embodiment of the present invention are style number 1N4148 which are available in commercial quantities from Texas Instruments Corporation. Operational amplifiers OP1, OP2 and OP3 in a preferred embodiment of the present invention are style number OP11 which is available in commercial quantities from Precision Monolithics Incorporated.

TABLE I

| Reference | Type or Value |
| --- | --- |
| R1 | 90.9K OHMS |
| R2 | 10.0K OHMS |
| R3 | 1.00K OHMS |
| R4 | 1.00 M OHMS |
| R5 | 100K OHMS |
| R6 | 275K OHMS |
| R7 | 22.6K OHMS |
| R8 | 13.0K OHMS |
| R9 | 1.96K OHMS |
| R10 | 26.1K OHMS |
| R11 | 26.1K OHMS |
| R12 | 16.9K OHMS |
| R13 | 1.00 M OHMS |
| R14 | 1.00 M OHMS |
| R15 | 100 OHMS |
| R16 | 32.4K OHMS |
| R17 | 274.0K OHMS |
| R18 | 4.99K OHMS |
| R19 | 10.0K OHMS |
| R20 | 100K OHMS |
| R21 | 4.99K OHMS |
| R22 | 10.0K OHMS |
| R23 | 1.00K OHMS |
| R24 | 100K OHMS |
| R25 | 10.0K OHMS |
| C1 | 1.0 Micro Farads |
| C2 | 0.1 Micro Farads |
| C3 | .001 Micro Farads |
| C4 | 0.01 Micro Farads |
| C5 | 1.0 Micro Farads |
| C6 | 100.00 Pico Farads |
| C7 | .22 Micro Farads |
| U1 | 54LS191 |
| U2 | 54LS191 |
| U3 | DAC08 |
| U4 | 54LS175A |
| U5 | 54LS175A |
| U6 | 54LS175A |
| U7 | 54LS175A |
| OP1 | OP11 |
| OP2 | OP11 |
| OP3 | OP11 |

TABLE I-continued

| Reference | Type or Value |
|---|---|
| Q1 | 2N3250A |
| AR1 | LM135 |
| CR1 | 1N751A |
| CR2 | 1N751A |
| CR3 | 1N4148 |
| CR4 | 1N4148 |

The preferred embodiment of the present invention has been described in considerable detail and specifically illustrated in FIGS. 1 and 2. However, it should be understood that alternative embodiments of the present invention are possible by selective modification of the circuit shown in FIG. 2. For example, the functions performed by the circuitry in FIG. 2 could be alternatively performed by a microprocessor based system. It should also be apparent that other embodiments of the present invention should be considered to be within its scope. Therefore, although the present invention has been described with significant specificity, it should not be considered to be so limited.

What I claim is:

1. A fuel control circuit for a turbine engine, comprising:
   means for determining a minimum fuel demand level necessary to prevent flameout for said turbine engine, said determining means being operative during low-load operation of said turbine engine; and
   means for causing the storing of said minimum fuel demand level, said causing means being connected in signal communication with said determining means.

2. The fuel control circuit of claim 1, wherein:
   said determining means comprises a means for measuring output power of said turbine engine.

3. The fuel control circuit of claim 2, wherein:
   said determining means comprises a means for defining a threshold magnitude of said output power of said turbine engine.

4. The fuel control circuit of claim 3, wherein:
   said causing means comprises a means for deactivating said determining means when said output power of said turbine engine exceeds said threshold magnitude of said output power of said turbine engine.

5. The fuel control circuit of claim 1, further comprising:
   means for preventing a fuel demand level of said turbine engine from decreasing below said minimum fuel demand level.

6. A fuel control circuit for a turbine engine, comprising:
   first means for measuring output power of said turbine engine;
   means for determining a first value of minimum fuel demand necessary to prevent extinction of said turbine engine during operation when a magnitude of said output power is at a low-load level of operation less than a predefined threshold value;
   means for causing said first value of minimum fuel demand to be stored, said causing means being connected in signal communication with said first measuring means with an input of said causing means being coupled to an output of said first measuring means, said causing means being connected in signal communication with said determining means with an output of said causing means being coupled to an input of said determining means; and
   means for preventing said fuel demand from decreasing below said first value of minimum fuel demand during operation, said preventing means being connected in signal communication with said determining means with an input of said preventing means being coupled to an output of said determining means.

7. The fuel control circuit of claim 6, wherein:
   said causing means comprises a means for comparing said output power of said turbine engine with said predefined threshold value.

8. The fuel control circuit of claim 7, wherein:
   said determining means comprises a means for maintaining a digital value representative of said first value of said minimum fuel demand.

9. The fuel control circuit of claim 8, wherein:
   said determining means comprises a converter means for converting said digital value to an analog value representative of said first value of said minimum fuel demand.

10. The fuel control circuit of claim 9, wherein:
    said causing means comprises a means for inhibiting said maintaining means from changing said digital value representative of said first value of said minimum fuel demand.

11. The fuel control circuit of claim 10, wherein:
    said preventing means comprises a means for setting a minimum magnitude of said fuel demand generally representative of said first value of said minimum fuel demand.

12. A fuel control system for a turbine engine, comprising:
    first means for providing a first signal representative of a magnitude of output power of said turbine engine;
    means for comparing said first signal to a predetermined threshold value, said comparing means being connected in signal communication with said first providing means;
    second means for providing a second signal representative of a fuel demand of said turbine engine;
    third means for providing a third signal representative of a minimum fuel demand of said turbine engine necessary to prevent flameout, said third providing means comprising a means for periodically adjusting said third signal during low-level operation in response to changes in said second signal altered by said first signal, said periodic adjusting means being connected in signal communications with said second providing means; and
    means, connected in signal communication with said periodic adjusting means, for inhibiting said periodic adjusting means, said inhibiting means being connected in signal communication with an output of said comparing means, said inhibiting means being responsive to a fourth signal form said output of said comparing means, said fourth signal being representative of a predefined relationship between said first signal and said predefined threshold value.

13. The fuel control circuit of claim 12, further comprising:
    means for altering said third signal in response to temperature.

14. The fuel control circuit of claim 13, further comprising:

timer means for providing a timing signal, said timing signal comprising a series of pulses having a generally constant frequency, said timer means being connected in signal communication with said third providing means.

15. The fuel control circuit of claim 14, wherein: said periodic adjusting means comprises a fourth means for comparing said second signal altered by said first signal with said third signal, said fourth comparing means being connected in signal communication with said second and third providing means.

16. The fuel control circuit of claim 15, wherein: said third providing means comprises a counter connected in signal communication with said periodic adjusting means, said counter being configured to maintain a digital value representative of the magnitude of said second signal altered by said first signal.

17. The fuel control circuit of claim 16, wherein: said third providing means comprises a means for converting said digital value to an analog signal.

18. A fuel control system for a turbine engine, comprising:
first means for providing a first signal representative of a magnitude of output power of said turbine engine;
means, connected in signal communication with said first providing means for comparing said first signal with a predefined threshold value;
second means for providing a second signal representative of a fuel demand of said turbine engine; and
third means, connected in signal communication with said second providing means, for providing a third signal representative of a minimum fuel demand of said turbine engine necessary to prevent extinction, said third providing means being operative to adjust said third signal during low-load operation of said turbine engine, said third providing means being connected in signal communication with said first comparing means and being responsive to a fourth signal from said first comparing means, said fourth signal being generated by said first comparing means upon the occurrence of a predefined relationship between said first signal and said predefined threshold value, said third providing means being adapted to maintain the magnitude of said third signal in response to said fourth signal.

19. The fuel control circuit of claim 18, further comprising:
means for adjusting said third signal in response to temperature.

20. The fuel control circuit of claim 14, wherein: said third providing means comprises a means for comparing said third signal with said second signal altered by said first signal and adjusting said third signal in response to the magnitude of said second signal altered by said first signal.

21. The fuel control circuit of claim 18, further comprising:
means for delaying the receipt of said fourth signal by said third providing means.

22. The fuel control circuit of claim 20, further comprising:
means for increasing the magnitude of said third signal relative to the magnitude of said second signal altered by said first signal by a preselected offset level, said increasing means being connected in signal communication with said third providing means.

23. The fuel control circuit of claim 18, wherein: said third providing means comprises a counter adapted to maintain a digital value representative of said second signal altered by said first signal.

24. The fuel control circuit of claim 25, wherein: said third providing means comprises a digital-to-analog converter connected in signal communication with said counter to convert said digital value to an analog signal.

25. A fuel control system for a turbine engine, comprising:
a sensor configured to provide a first signal representative of the output power of said turbine engine;
a load threshold circuit connected in signal communication with said sensor, said load threshold circuit being configured to compare said first signal with a predefined threshold value;
means for providing a second signal representative of fuel demand of said turbine engine;
a counter connected in signal communication with said providing means for maintaining a digital value representative of said second signal altered by said first signal;
a converter connected to said counter, said converter providing a third signal, said third signal being an analog representation of said digital value;
a fuel level detector having inputs coupled to said first, second and third signals and an output connected in signal communication with said counter, said detector providing a signal to said counter which causes said counter to change said digital value in response to a predefined relationship between said first, second and third signals; and
said load threshold circuit providing a fourth signal when said first signal exceeds said predefined threshold value, said counter being connected in signal communication with said load threshold circuit, said counter being configured to be inhibited in response to said fourth signal from changing the magnitude of said digital value in response to said fourth signal.

26. The fuel control circuit of claim 25, wherein: said first signal is directly related to an output current of said turbine engine.

27. The fuel control circuit of claim 25, further comprising:
means for changing said third signal in response to changes in temperature.

28. The fuel control circuit of claim 25, further comprising:
means connected in signal communication with said counter for adding an offset to said digital value relative to the magnitude of said second signal altered by said first signal.

29. The fuel control circuit of claim 25, further comprising:
means for delaying the receipt of said fourth signal by said counter.

* * * * *